May 22, 1956      R. T. STAHL      2,746,847
PROVOLONE AND CACCIACAVALLO CHEESE MANUFACTURE
Filed Nov. 20, 1952
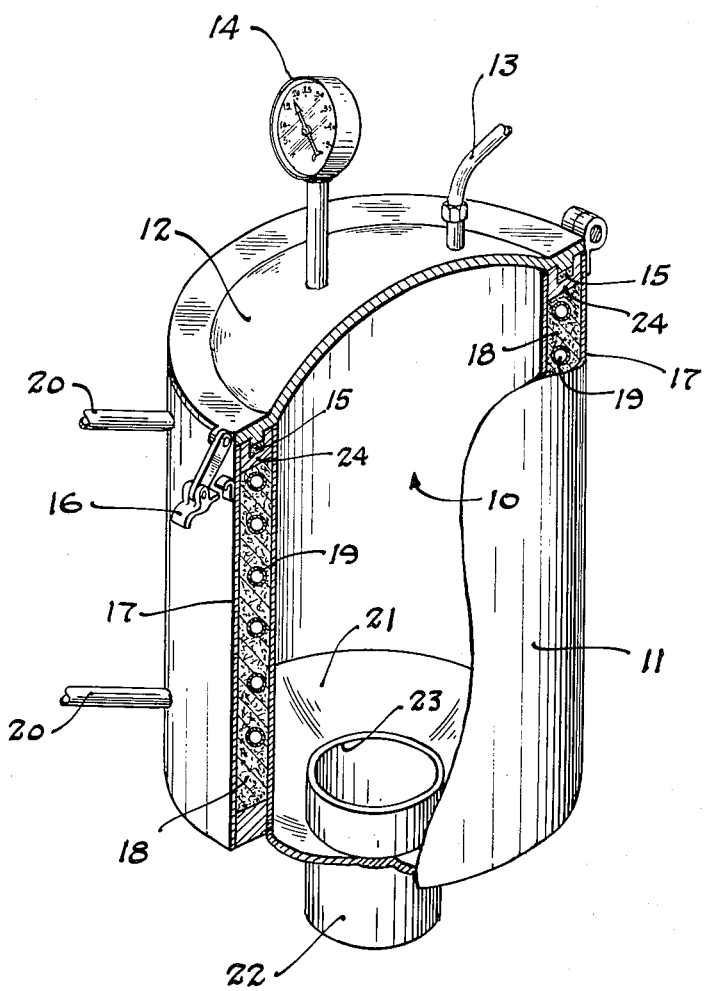
INVENTOR.
Raymond T. Stahl
BY
ATTORNEY

United States Patent Office

2,746,847
Patented May 22, 1956

2,746,847

PROVOLONE AND CACCIACAVALLO CHEESE MANUFACTURE

Raymond T. Stahl, Homewood, Ill., assignor to Swift & Company, Chicago, Ill., a corporation of Illinois Application November 20, 1952, Serial No. 321,614

6 Claims. (Cl. 31—89)

This invention relates in general to improvements in the manufacture of cheese of the Provolone and Cacciacavallo type, cheeses of Italian origin characterized by the stringy appearance of the matted curds after kneading and stretching. More particularly, the invention concerns a process and apparatus for manipulating cut matted curds preparatory to dividing them into individual cheese lengths suitable for molding, hardening, curing, and drying.

Heretofore, the manufacture of Provolone type cheese has been a protracted and expensive process due largely to the number and complexity of the hand operations required. Briefly, the conventional process is as follows: Properly treated milk is coagulated with rennet paste or its extract. Heat and agitation coact to form the curds. Whey removal, matting and cutting into long thin strips follow at suitable intervals. The strips are in turn passed through a curd mill with cutters removed. The resultant strings are then placed in a wooden tub and covered with hot water, the temperature of which ranges from about 150°–200° F. depending on the texture of the curd and on its acidity. Wooden paddles then stir and work the curd until it attains the appearance and consistency of taffy following which the individual pieces are removed from the tank, weighed to the proper size and then hand kneaded and stretched while being intermittently dipped in hot water until the curds become smooth and free from lumps. Additional homogeneity is thereby imparted, all whey pockets are eliminated and the excess liquid expressed. It is from this kneading and stretching step that Provolone type cheese curds obtain the peculiar stringy texture referred to above. At this point the curd is almost ready to be hand molded into any one of a number of shapes, generally resembling a loaf, a step which just precedes brine curing. However, once again hand manipulation is necessitated. For protective purposes and so as to insure a smooth appearing surface, the molder must cause a tight, thin film of cheese to be stretched over the entire surface. By working from one end, stretching and intermittently dipping the mass into hot water, the desired film is obtained.

Following the skin-forming step, the unit is firmed by immersion in cold water. Treatment with salt brine, tying, smoking, and paraffining complete the process.

The operation following removal of the matted curds from the wooden tub and prior to firming in cold water are costly due to the necessity for employing only skilled workers and due to the time-consuming nature of the manipulations themselves. In addition, they are unpleasant because of the need for keeping the curds hot during kneading.

It is, therefore, an object of this invention to provide a method and apparatus for kneading and otherwise manipulating cheese curds so as to insure complete whey removal as well as to increase homogeneity in the product.

An additional object is to provide an apparatus and method whereby Provolone and Cacciacavallo type cheese may be provided with a smooth, protective stretched skin without requiring the objectionable hand operations of the prior art.

Various other and ancillary objects and advantages of the invention will become apparent during the course of the explanation below.

Briefly, the invention comprises removing conventionally-formed, taffy-like Provolone or Cacciacavallo type curds from the aforementioned 150° to 200° F. water bath following the usual stirring and the working, subjecting said curds to hand-kneading of limited duration to initiate whey and lump elimination and then placing said curds in a fluid-pressure actuated extrusion chamber having an inwardly raised annular sharp-edged member positioned at the entrance to the extrusion orifice and tube. The application of pressure results in a turbulence within the chamber which completes whey and lump removal and subsequently causes extrusion of a product in the desired surface-protected loaf form.

A complete understanding of the invention may be obtained by referring to the following description and accompanying drawing which together disclose the operations and apparatus of the invention.

In the drawing:

The figure represents a perspective, partially-sectional view of the cheese curd extrusion machine of this invention.

The numeral 10 indicates the internal hopper or chamber of the extrusion device 11. The hinged cover 12 is equipped with a fitting 13 connected to a source of compressed air (not shown), an air pressure gauge 14, a gasket 15 and latch 16. Surrounding the chamber 10 is a jacket 17 so placed as to provide a space for insulating material 18, and a coil 19 through which circulates steam or a heated fluid supplied and removed by lines 20. Integral with the domed bottom 21 is the outlet mouthpiece 22, which, as the drawing indicates, is provided with an inwardly-raised, cylindrical sharp edged member 23. A seat 24 is provided for cover 12.

In carrying out the process the operator may employ hoppers of varying sizes. In using a small chamber, cheese curds, the quantity of which is dependent on the size load desired, are removed from the aforementioned wooden tub and worked to a lesser degree than would ordinarily be necessary so as to eliminate whey pockets. The lid 12 is now swung open and the hopper charged with the weighed curds. No weighing of curds is necessary if the larger chamber is employed, in which case the extruded box is simply severed at appropriate points by a suitable shearing means. The lid is closed and sealed in place. The cheese, though softened somewhat by the passage of steam through the coils 19 remains sufficiently stiff to resist passage through the tube 22. Air under pressure is introduced by means of the fitting 13 until the pressure reaches about 15 to 25 p. s. i. within the chamber. At this point there is no matting of the curds since the only pressure against the upper surface of the cheese is supplied by the compressed air. Instead, a degree of turbulence or a rolling effect results as the entire body of cheese attempts to escape from the chamber through the single orifice thereby aiding in removing occluded whey from the curd mass. Before passage can be effected, the lower surface of the curds must pass over and be subjected to a shearing action imparted by the cylindrical, sharp-edged member 23, whereby an entirely new outside surface having a perfectly smooth appearance is formed. The forward progress of this fresh surface is impeded by its contact with and adhesion to the tubular wall 22 while the great bulk of the cheese mass passes at a greater speed through the central portion of the nozzle.

Beneath the extrusion nozzle the curd surface rapidly becomes a tough protective skin due to contact with cool air while the necessity that such skin encase ever-increasing quantities of molten cheese results in a stretching action and a progressively smoother surface. As indicated previously, substantially identical results may be achieved by laborious and time-consuming hand manipulations. However, attempts in the past to substitute a mechanical device of any kind for the skilled worker have met with failure since the passage of the cheese through the discharge tube has afforded the only opportunity for increasing the smoothnes of the curd surfaces. It has been found that cheese, the surface of which has become wrinkled and uneven in the chamber, is ineffectively polished in this manner. The introduction of the sharp edged flange is an acceptable solution to the problem. This member imparts to the surface, which is to serve as the skin of the cheese loaf or cylinder, an appearance substantially identical to that obtained by the conventional hand molding procedures and in a more expeditious and economical manner.

In addition, the improved effect of the application of fluid rather than the conventional mechanical pressure to the molten curds is of significance. Contact of a plate with the upper surface of the cheese results in a matting effect, that is, the production of a tight, somewhat finished, surface. However, as the curds approach the outlet mouthpiece, the usual funnel-like construction of cheese extruders initiates a rolling effect which results in the production of an inferior product. The rolling pulls the matted surface within the cheese body so that homogeneity of the cheese mass is sacrificed. By way of contrast, fluid pressure produces no surface matting and, consequently, a more homogeneous product. Though air has been used in the description as the pressure-imparting medium, it is obviously within the scope of the invention to employ fluid materials other than air, inert gases such as nitrogen or even heated water being acceptable, for example.

Certain modifications and changes in both method and construction may be made without departing from the scope of the invention disclosed. Therefore, only such limitations should be imposed as are indicated in the appended claims.

I claim:
1. An extrusion device for cheese and the like comprising in combination: a chamber defining means; means associated with said chamber defining means for applying pressure to said chamber, and said chamber defining means having an outlet defining member of sufficient size to admit passage of said cheese extending thereinto and terminating on the interior end thereof in a sharp peripheral edge.

2. The device of claim 1 wherein the pressure applying means applies fluid pressure.

3. The device of claim 1 wherein said chamber defining means is provided with means for controlling the temperature of the interior thereof.

4. The device of claim 1 wherein the outlet defining member is disposed in the lowermost portion of the chamber defining means.

5. The device of claim 1 wherein the outlet defining member is a cylindrical body.

6. An extrusion device for cheese and the like comprising in combination: a sealable chamber; a coil disposed about said chamber and substantially contiguous therewith; means for introducing a heating fluid into said coil for regulating the internal temperature of said chamber; means associated with said chamber for applying fluid pressure thereto; and a cylindrical outlet defining member positioned at the bottom of said chamber and extending thereinto, said outlet defining member terminating at the interior end thereof in a raised sharp peripheral edge.

References Cited in the file of this patent

UNITED STATES PATENTS

| | | |
|---|---|---|
| 1,676,224 | Spiliotakaras et al. | July 3, 1928 |
| 1,767,680 | Hutt | June 24, 1930 |
| 1,983,156 | Watkins et al. | Dec. 4, 1934 |
| 2,120,297 | Reinecke | June 14, 1938 |
| 2,272,954 | Sartori | Feb. 10, 1942 |
| 2,361,775 | Kraft | Oct. 31, 1944 |
| 2,492,878 | Miollis | Dec. 27, 1949 |
| 2,520,183 | Toone | Aug. 29, 1950 |